(12) United States Patent
Bronikowski et al.

(10) Patent No.: US 10,507,867 B2
(45) Date of Patent: Dec. 17, 2019

(54) METHOD AND SYSTEM FOR GENERATING STEERING COMMANDS TO CANCEL OUT UNWANTED STEERING MOMENTS

(71) Applicant: GM GLOBAL TECHNOLOGY OPERATIONS LLC, Detroit, MI (US)

(72) Inventors: Scott A. Bronikowski, New Hudson, MI (US); Joshua R. Auden, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 15/708,709

(22) Filed: Sep. 19, 2017

(65) Prior Publication Data

US 2019/0084616 A1 Mar. 21, 2019

(51) Int. Cl.
*B62D 6/00* (2006.01)
*B62D 15/02* (2006.01)

(52) U.S. Cl.
CPC .......... *B62D 6/002* (2013.01); *B62D 15/021* (2013.01)

(58) Field of Classification Search
CPC ........ B62D 6/002; B62D 6/06; B62D 5/0472; B62D 15/021; B60G 17/00
See application file for complete search history.

(56) References Cited

U.S. PATENT DOCUMENTS

| | | | | |
|---|---|---|---|---|
| 4,951,199 A * | 8/1990 | Whitehead | ........... | B62D 5/0466 180/446 |
| 4,961,595 A * | 10/1990 | Fukushima | ........ | B60G 17/0163 280/5.506 |
| 5,351,985 A * | 10/1994 | Ando | ....................... | B60G 3/20 280/5.51 |
| 5,408,411 A * | 4/1995 | Nakamura | ......... | B60G 17/0182 701/48 |
| 6,178,365 B1 * | 1/2001 | Kawagoe | ............... | B62D 1/286 180/167 |
| 7,350,792 B1 * | 4/2008 | Garman | ................ | B60G 9/027 280/124.11 |
| 9,096,110 B1 * | 8/2015 | Bandy | ..................... | B62D 7/08 |
| 9,669,869 B2 * | 6/2017 | Kageyama | ............... | B62D 5/00 |
| 10,351,162 B1 * | 7/2019 | Katzourakis | ........... | B60G 21/05 |
| 2005/0209763 A1 * | 9/2005 | Offerle | .................. | B60T 8/1755 701/83 |
| 2006/0080016 A1 * | 4/2006 | Kasahara | ............... | B62D 5/006 701/41 |
| 2008/0054577 A1 * | 3/2008 | Horiuchi | .................. | B62D 6/02 280/5.522 |
| 2009/0001679 A1 * | 1/2009 | Kajino | ................... | B60G 11/50 280/124.106 |

(Continued)

*Primary Examiner* — Behrang Badii
*Assistant Examiner* — Daniel L Greene
(74) *Attorney, Agent, or Firm* — Cantor Colburn LLP

(57) ABSTRACT

A system and method for generating steering commands to cancel out unwanted steering moments is disclosed. The method includes determining, by a controller of a vehicle, an amount of suspension displacement that is caused as a result of driving the vehicle on an uneven road. The suspension displacement induces an unwanted steering moment. The method also includes determining a steering angle command based at least on the amount of suspension displacement. The method also includes performing the steering angle command. Performing the steering angle command cancels out the unwanted steering moment.

20 Claims, 2 Drawing Sheets

(56) References Cited

U.S. PATENT DOCUMENTS

| | | | | |
|---|---|---|---|---|
| 2010/0204887 A1* | 8/2010 | Ichinose | ............ | B60L 15/2036 |
| | | | | 701/41 |
| 2012/0296567 A1* | 11/2012 | Breed | .................... | G01C 21/26 |
| | | | | 701/468 |
| 2013/0245890 A1* | 9/2013 | Kageyama | ............... | B62D 7/18 |
| | | | | 701/41 |
| 2013/0304441 A1* | 11/2013 | Fricke | ................. | G06F 17/5009 |
| | | | | 703/6 |
| 2017/0137023 A1* | 5/2017 | Anderson | ......... | B60G 17/0195 |
| 2017/0137059 A1* | 5/2017 | Ohba | ....................... | B60K 7/00 |
| 2017/0240017 A1* | 8/2017 | Vandersmissen | .. | B60G 17/0164 |
| 2018/0357338 A1* | 12/2018 | Picot | .................. | G06F 17/5009 |

\* cited by examiner

METHOD AND SYSTEM FOR GENERATING STEERING COMMANDS TO CANCEL OUT UNWANTED STEERING MOMENTS

INTRODUCTION

The subject embodiments relate to generating a steering command to cancel out at least one unwanted steering moment. Specifically, one or more embodiments can be directed to automatically cancelling out unwanted steering moments that are induced by actions of an active suspension system. One or more embodiments can also be directed to automatically cancelling out unwanted steering moments that are induced by undesirable kinematics which occur as a result of a vehicle's design, for example.

A suspension system of a vehicle generally refers to a system of mechanical and/or electronic components that are configured to enable relative movement between the vehicle's body and the vehicle's wheels. By enabling the relative movement, the suspension system can improve vehicle handling by keeping the vehicle's wheels in contact with an uneven road. The suspension system can also improve the overall driving experience for the driver.

An active suspension is a type of suspension system where the relative movement between the vehicle body and the vehicle wheels is based at least on instructions that are provided by an electronic controller, for example. The electronic controller can be a part of an overall onboard computer of the vehicle.

SUMMARY

In one exemplary embodiment, a method includes determining, by a controller of a vehicle, an amount of suspension displacement that is caused as a result of driving the vehicle on an uneven road. The suspension displacement induces an unwanted steering moment. The method also includes determining a steering angle command based at least on the amount of suspension displacement. The method also includes performing the steering angle command. Performing the steering angle command cancels out the unwanted steering moment.

In another exemplary embodiment, the unwanted steering moment is induced when an active suspension system uses actuators to exert force upon dampers of the vehicle.

In another exemplary embodiment, the unwanted steering moment is induced when a design constraint results in undesirable kinematics.

In another exemplary embodiment, the method can also include determining an amount of force at which the suspension displacement occurred. The force induces the unwanted steering moment. The method also includes determining the steering angle command based on the amount of force.

In another exemplary embodiment, determining a steering angle command based on the amount of suspension displacement and the amount of force includes referencing at least one lookup table of pre-computed data.

In another exemplary embodiment, the at least one lookup table of pre-computed data reflects correspondences between amounts of suspension displacement and steering angle corrections that should be applied in order to cancel out steering moments that would be induced as a result of the corresponding amounts of suspension displacement.

In another exemplary embodiment, the at least one lookup table of pre-computed data reflects correspondences between amounts of force and steering angle corrections that should be applied in order to cancel out steering moments that would be induced as a result of the corresponding amounts of force.

In another exemplary embodiment, the method also includes determining an actual steering angle based on a position of one or more steering knuckles of the vehicle.

In another exemplary embodiment, the method also includes determining a driver-intended steering angle based on at least one of a steering wheel angle and a steering wheel torque.

In another exemplary embodiment, the steering angle command is performed if the actual steering angle is determined to be different from the driver-intended steering angle.

In another exemplary embodiment, a system within a vehicle includes an electronic controller configured to determine an amount of suspension displacement that is caused as a result of driving the vehicle on an uneven road. The suspension displacement induces an unwanted steering moment. The electronic controller is also configured to determine a steering angle command based at least on the amount of suspension displacement. The electronic controller is also configured to perform the steering angle command. Performing the steering angle command cancels out the unwanted steering moment.

In another exemplary embodiment, the unwanted steering moment is induced when an active suspension system uses actuators to exert force upon dampers of the vehicle.

In another exemplary embodiment, the unwanted steering moment is induced when a design constraint results in undesirable kinematics.

In another exemplary embodiment, the electronic controller is further configured to determine an amount of force at which the suspension displacement occurred. The force induces the unwanted steering moment. The electronic controller is further configured to determine the steering angle command based on the amount of force.

In another exemplary embodiment, determining a steering angle command based on the amount of suspension displacement and the amount of force includes referencing at least one lookup table of pre-computed data.

In another exemplary embodiment, the at least one lookup table of pre-computed data reflects correspondences between amounts of suspension displacement and steering commands that should be generated in order to cancel out steering moments that would be induced as a result of the corresponding amounts of suspension displacement.

In another exemplary embodiment, the at least one lookup table of pre-computed data reflects correspondences between amounts of force and steering commands that should be generated in order to cancel out steering moments that would be induced as a result of the corresponding amounts of force.

In another exemplary embodiment, the electronic controller is further configured to determine an actual steering angle based on a position of one or more steering knuckles of the vehicle.

In another exemplary embodiment, the electronic controller is further configured to determine a driver-intended steering angle based on at least one of a steering wheel angle and a steering wheel torque.

In another exemplary embodiment, the steering angle command is performed if the actual steering angle is determined to be different from the driver-intended steering angle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
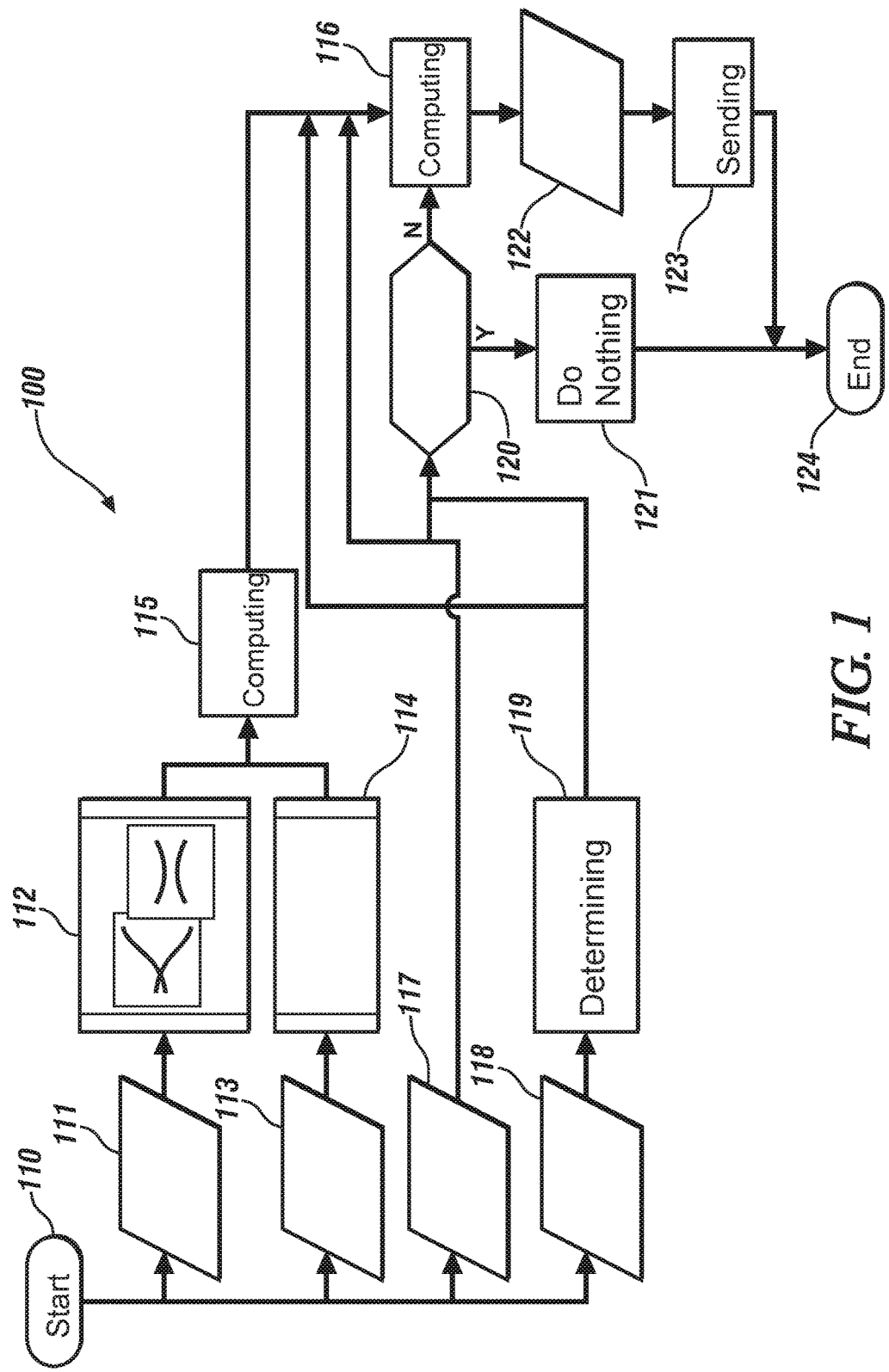
FIG. 1 illustrates a system for automatically generating steering commands to cancel out unwanted steering moments in accordance with one or more embodiments.

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As described above, an active suspension system enables/controls a relative movement between a vehicle body and vehicle wheels as the vehicle travels along a road. Responsive to the vehicle's travel upon uneven portions of road, the active suspension system of the vehicle can control the relative movement by exerting forces to control a vertical displacement of different vehicle components. For example, active suspension systems can use actuators to exert force upon vehicle dampers in order to control a vertical displacement of the vehicle dampers. Specifically, the active suspension system uses actuators to control the force upon the vehicle dampers to keep the vehicle in contact with the road as the vehicle moves over road bumps, road holes, and other uneven portions of the road's surface. A vehicle damper is generally considered to be a mechanical device that is configured to absorb kinetic energy of shocks that are encountered during operation of the vehicle on the road.

As described above, when a vehicle with an active suspension system drives over a road bump, road hole, and/or any other type of uneven road surface, the active suspension system uses actuators to control an up-and-down force upon the vehicle dampers in order to keep the vehicle in contact with the road. However, as the actuators forcibly move the vehicle dampers up and down, the actuators can also cause the wheels to inadvertently steer at a slight angle (even if the driver is steering the vehicle directly straight). These slight steering angles are considered to be unwanted, induced steering moments, which are perceived by drivers/passengers as being a slight lateral sway effect.

These slight steering angles can be attributed to the specific positioning of the dampers relative to a steering axis of the vehicle. Because the dampers of the vehicle are positioned in a non-collinear manner relative to the steering (kingpin) axes of the steering knuckles connected to the individual wheels, when the actuators move the vehicle dampers up-and-down in response to the vehicle wheels encountering an uneven portion of road, the up-and-down movement of the vehicle dampers is not an entirely vertical movement. Rather, the up-and-down movement can appear as arcs in a plan view and a front view. As such, the forces exerted by the active suspension system upon the vehicle dampers can cause the wheels to steer at slight angles (thus inducing unwanted steering moments). Therefore, as the active suspension system exerts forces in response to encountering an uneven portion of road, the wheels will be inadvertently slightly steered away from the driver's intended steering angle/path.

In the event that a traditional non-active suspension system is used to control the body movement of the vehicle, different packaging and/or other design constraints can cause undesirable kinematics. These undesirable kinematics can also cause induced unwanted steering moments. For example, with certain vehicles, the specific design constraints relating to vehicle packaging can increase an angle between a plane upon which a damper moves and an axis upon which the wheels turn. An increase in this angle tends to result in an increased amount of induced steering moments when the vehicle travels upon uneven portions of road.

In view of the above-described difficulties, one or more embodiments are directed to a system and method for automatically generating a steering command to cancel out unwanted induced steering moments. The system and method of one or more embodiments can be configured to generate automated steering commands to cancel out unwanted steering moments that have been induced by the vehicle's suspension system. The automatically-generated steering commands can be generated based on pre-computed data and/or detected kinematic data, as described in more detail below.

One or more embodiments can automatically generate the steering command based on pre-computed data that is contained within a lookup table, for example. In one example, the lookup table can reflect correspondences between an amount of displacement (as measured between vehicle body and vehicle wheels) and the parameters/characteristics of a steering command that should be generated in order to cancel out the steering moments that would be induced as a result of the displacement. Other embodiments can measure displacement based on different reference points. In another example, the lookup table can reflect correspondences between an amount of force at which the displacement occurred and the parameters/characteristics of a corresponding steering command that should be generated in order to cancel out the steering moments that would be induced as a result of the force. For example, by referencing the lookup table, one or more embodiments can determine parameters/characteristics of an appropriate steering command to be generated (to cancel out induced steering moments) based at least on a measured displacement and/or a measured force of displacement.

The generated steering command that is based on a measurement of displacement and/or force can be considered to be a baseline steering command, which can be further modified as described in more detail herein.

One or more embodiments can further fine-tune/modify the baseline steering command based on additional detected data. One example of additional detected data is an actual steering angle of the vehicle. The actual steering angle of the vehicle can be detected based on a position of one or more steering knuckles of the vehicle. A steering knuckle is generally considered to be a component that includes a wheel hub/spindle and which connects to the suspension system of the vehicle. By using sensors to detect the position of the one or more steering knuckles, one or more embodiments can measure a steering angle that accurately reflects an actual steering angle between the vehicle and the road.

As described in more detail herein, the above-described actual steering angle can be compared against a driver-intended steering angle. A driver-intended steering angle is generally considered to be a steering angle that the driver intends to steer the car upon. The driver-intended steering angle can be determined based on a measured steering angle and/or a measured steering torque. If a difference exists between the driver-intended steering angle and the actual steering angle, then one or more embodiments can generate a steering command that corrects the actual steering angle to be in accordance with the driver-intended steering angle, as described in more detail below.

FIG. 1 illustrates a system 100 for automatically generating steering commands to cancel out unwanted steering moments in accordance with one or more embodiments. System 100 can be implemented by a processor in conjunction with an active suspension system. System 100 can be implemented by an electronic control unit (ECU), for example. In other embodiments, system 100 can be implemented by a processor in conjunction with a non-active suspension system. At 110, system 100 can begin a method for generating steering commands to cancel out unwanted steering moments. One or more embodiments can automatically generate steering commands to cancel out unwanted (induced) steering moments without needing any input from the driver. At 111, the method measures or receives a measurement of a suspension vertical displacement. In other words, the method measures or receives a measurement of an amount of suspension vertical displacement that has been caused as a result of driving the vehicle on an uneven road. In one or more embodiments, the suspension vertical displacement can be between the vehicle body and the vehicle wheels. However, other embodiments can use other reference points to measure the suspension vertical displacement. At 112, the method can reference a first lookup table to determine a steering angle change that is necessary to be generated based on the measurement of suspension vertical displacement. The first lookup table can describe correspondences between measured suspension vertical displacements and steering angle changes. Specifically, within the first lookup table, each suspension vertical displacement would induce a steering moment that is cancelled out by applying the corresponding steering angle change.

At 113, the method can measure and/or receive a measurement of suspension vertical force. The suspension vertical force can generally correspond to a measure of force that is applied, in a vertical direction, by the suspension system. At 114, the method can input the measured suspension vertical force into a second lookup table. The second lookup table can describe correspondences between measurements of suspension vertical force and steering angle changes that are necessary for cancelling unwanted steering moments that would be caused by the corresponding measured suspension vertical force. At 115, the method can compute/determine a steering angle correction based on the steering angle changes determined from steps 112 and 114. The computed/determined steering angle correction can correspond to a steering angle that would need to be applied by an electronic power steering (EPS) system—which may be located at any or all of the front or rear wheels of the vehicle—in order to cancel the unwanted steering moments.

At 117, the method can measure an actual steering angle. As described above, the actual steering angle can be measured/determined based on a position of one or more steering knuckles of the vehicle. By using sensors to detect the position of the one or more steering knuckles, one or more embodiments can accurately measure the actual steering angle that is between the vehicle and the road.

At 118, the method can measure a steering wheel torque and/or a steering wheel angle. One or more methods can also receive a measurement of a steering wheel torque and/or a steering wheel angle. A steering wheel torque can correspond to a measurement of an amount of torque that is applied by the driver to the steering wheel. A steering wheel angle can correspond to an angle that the driver positions the steering wheel. Based on the measurement of steering wheel torque and the measurement of steering wheel angle, at 119, the method can determine a driver-intended steering angle. The driver-intended steering angle corresponds to the angle/path upon which the driver intends to direct the vehicle.

At 120, the method can determine whether the driver-intended steering angle of 119 is equal to the actual steering angle of 117. If the driver-intended steering angle is not equal to the actual steering angle, then the method, at 116, computes/determines a final steering correction angle. The final steering correction angle, if applied, cancels out unwanted induced steering moments and corrects the actual steering angle to correspond to the driver-intended steering angle. At 116, the method can compute/determine the final steering correction angle based on the computed/determined steering angle correction of 115, the actual steering angle of 117, and/or the determined driver-intended steering angle of 119. At 122, the method can generate a steering torque request and/or a steering angle request that cancels out induced steering moments and that corrects any differences between the actual steering angle and the driver-intended steering angle. At 123, the method can send the generated requests to a front or rear electric power steering (EPS) system. At 120, if the driver-intended steering angle is equal to the measured steering angle, then the method, at 121, does not do anything. At 124, the method can end.

Figure 2:
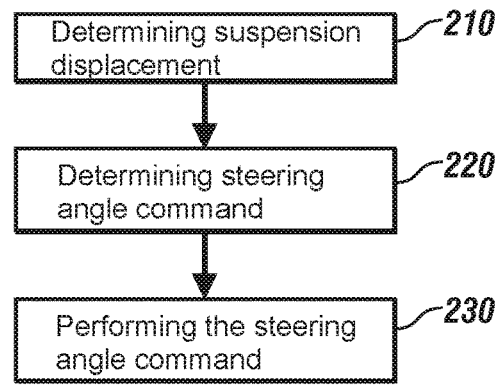
FIG. 2 depicts a flowchart of a method in accordance with one or more embodiments.

FIG. 2 depicts a flowchart of a method in accordance with one or more embodiments. The method of FIG. 2 can be performed in order to generate steering commands to cancel out unwanted steering moments. The method of FIG. 2 can be performed by a vehicle controller. For example, the method of FIG. 2 can be performed by a vehicle controller of a suspension system and/or a steering system. The method of FIG. 2 can also be performed by an ECU, for example. The method can include, at block 210, determining, by a controller of a vehicle, an amount of suspension displacement that is caused as a result of driving the vehicle on an uneven road. The suspension displacement induces an unwanted steering moment. The method, at 220, includes determining a steering angle command based at least on the amount of suspension displacement. The method, at 230, includes performing the steering angle command. Performing the steering angle command cancels out the unwanted steering moment.

Figure 3:
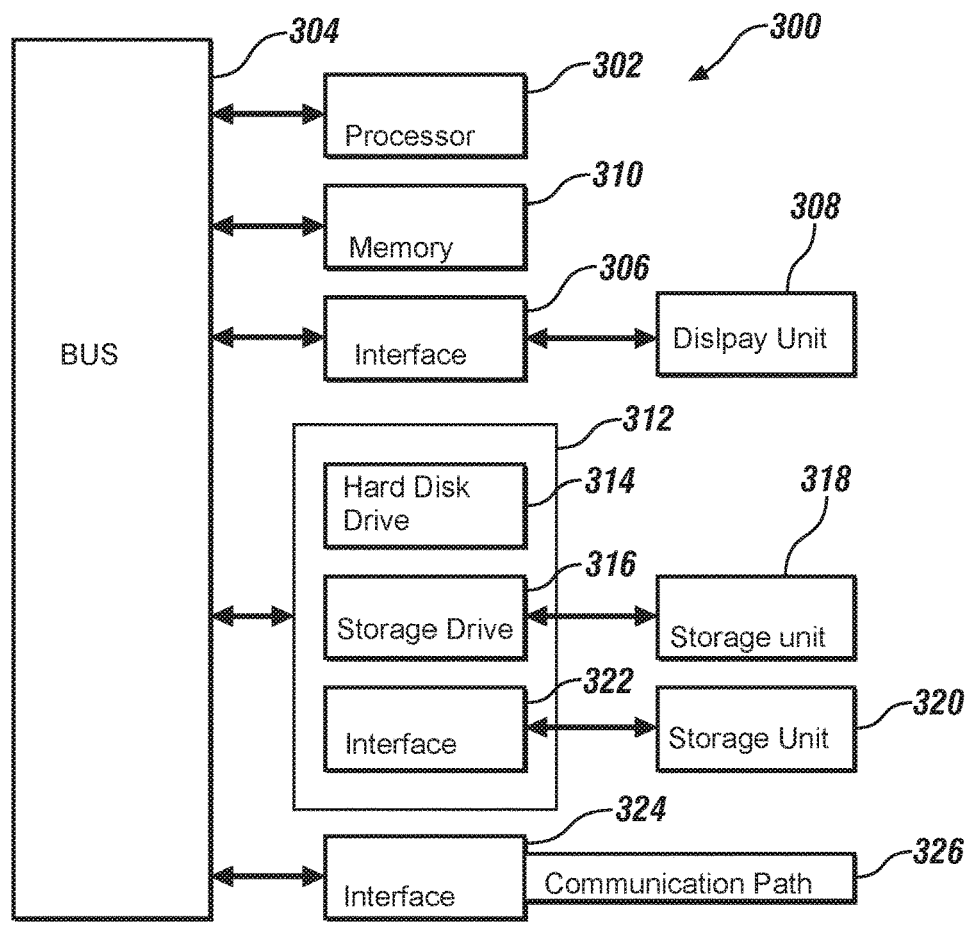
FIG. 3 depicts a high-level block diagram of a computing system, which can be used to implement one or more embodiments.

FIG. 3 depicts a high-level block diagram of a computing system 300, which can be used to implement one or more embodiments. Computing system 300 can correspond to, at least, a system that is configured to generate steering commands to cancel out unwanted steering moments, for example. The generating system can be a part of an embedded system of electronics within a vehicle. With one or more embodiments, computing system 300 can correspond to an electronic control unit (ECU) of a vehicle. Computing system 300 can be used to implement hardware components of systems capable of performing methods described herein. Although one exemplary computing system 300 is shown, computing system 300 includes a communication path 326, which connects computing system 300 to additional systems (not depicted). Computing system 300 and additional system are in communication via communication path 326, e.g., to communicate data between them.

Computing system 300 includes one or more processors, such as processor 302. Processor 302 is connected to a communication infrastructure 304 (e.g., a communications bus, cross-over bar, or network). Computing system 300 can include a display interface 306 that forwards graphics, textual content, and other data from communication infrastructure 304 (or from a frame buffer not shown) for display on a display unit 308. Computing system 300 also includes a main memory 310, preferably random access memory (RAM), and can also include a secondary memory 312. There also can be one or more disk drives 314 contained within secondary memory 312. Removable storage drive 316 reads from and/or writes to a removable storage unit 318. As will be appreciated, removable storage unit 318 includes a computer-readable medium having stored therein computer software and/or data.

In alternative embodiments, secondary memory 312 can include other similar means for allowing computer programs or other instructions to be loaded into the computing system. Such means can include, for example, a removable storage unit 320 and an interface 322.

In the present description, the terms "computer program medium," "computer usable medium," and "computer-readable medium" are used to refer to media such as main memory 310 and secondary memory 312, removable storage drive 316, and a disk installed in disk drive 314. Computer programs (also called computer control logic) are stored in main memory 310 and/or secondary memory 312. Computer programs also can be received via communications interface 324. Such computer programs, when run, enable the computing system to perform the features discussed herein. In particular, the computer programs, when run, enable processor 302 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method comprising:
   determining, by a controller of a vehicle, an amount of suspension displacement that is caused as a result of driving the vehicle on an uneven road, wherein the suspension displacement induces an unwanted steering moment;
   determining a steering angle command based at least on the amount of suspension displacement by referencing a first lookup table corresponding measured suspension vertical displacements and steering angle changes; and
   performing the steering angle command, wherein performing the steering angle command cancels out the unwanted steering moment.

2. The method of claim 1, wherein the unwanted steering moment is induced when an active suspension system uses actuators to exert force upon dampers of the vehicle.

3. The method of claim 1, wherein the unwanted steering moment is induced when a design constraint results in undesirable kinematics.

4. The method of claim 1, wherein the suspension displacement is a vertical displacement between a body of the vehicle and at least one wheel of the vehicle.

5. The method of claim 1, further comprising:
   determining an amount of force at which the suspension displacement occurred, wherein the force induces the unwanted steering moment; and
   determining the steering angle command based on the amount of force.

6. The method of claim 5, wherein determining a steering angle command based on the amount of suspension displacement and the amount of force comprises referencing a second lookup table of pre-computed data.

7. The method of claim 6, wherein the a second lookup table of pre-computed data reflects correspondences between amounts of suspension displacement and steering angle corrections that should be applied in order to cancel out steering moments that would be induced as a result of the corresponding amounts of suspension displacement.

8. The method of claim 6, wherein the a second lookup table of pre-computed data reflects correspondences between amounts of force and steering angle corrections that should be applied in order to cancel out steering moments that would be induced as a result of the corresponding amounts of force.

9. The method of claim 1, further comprising determining an actual steering angle based on a position of one or more steering knuckles of the vehicle.

10. The method of claim 9, further comprising determining a driver-intended steering angle based on at least one of a steering wheel angle and a steering wheel torque.

11. The method of claim 10, wherein the steering angle command is performed when the actual steering angle is determined to be different from the driver-intended steering angle.

12. A system within a vehicle, comprising:
    an electronic controller configured to:
    determine an amount of suspension displacement that is caused as a result of driving the vehicle on an uneven road, wherein the suspension displacement induces an unwanted steering moment;
    determine a steering angle command based at least on the amount of suspension displacement by referencing a first lookup table corresponding measured suspension vertical displacements and steering angle changes; and
    perform the steering angle command, wherein performing the steering angle command cancels out the unwanted steering moment.

13. The system of claim 12, wherein the unwanted steering moment is induced when an active suspension system uses actuators to exert force upon dampers of the vehicle.

14. The system of claim 12, wherein the unwanted steering moment is induced when a design constraint results in undesirable kinematics.

15. The system of claim 12, wherein the electronic controller is further configured to:
    determine an amount of force at which the suspension displacement occurred, wherein the force induces the unwanted steering moment; and
    determine the steering angle command based on the amount of force.

16. The system of claim 15, wherein determining a steering angle command based on the amount of suspension displacement and the amount of force comprises referencing a second lookup table of pre-computed data.

17. The system of claim 16, wherein the a second lookup table of pre-computed data reflects correspondences between amounts of suspension displacement and steering angle corrections that should be generated in order to cancel out steering moments that would be induced as a result of the corresponding amounts of suspension displacement.

18. The system of claim 16, wherein the a second lookup table of pre-computed data reflects correspondences between amounts of force and steering angel corrections that should be applied in order to cancel out steering moments that would be induced as a result of the corresponding amounts of force.

19. The system of claim 12, wherein the electronic controller is further configured to determine an actual steering angle based on a position of one or more steering knuckles of the vehicle.

20. The system of claim 19, wherein the electronic controller is further configured to determine a driver-intended steering angle based on at least one of a steering wheel angle and a steering wheel torque.

* * * * *